Sept. 11, 1951  G. A. DEVLIN  2,567,699
PUMP
Filed April 16, 1947  2 Sheets-Sheet 1

INVENTOR.
George A. Devlin
BY
Barnes, Kisselle, Laughlin & Rauch
ATTORNEYS

Sept. 11, 1951 G. A. DEVLIN 2,567,699
PUMP
Filed April 16, 1947 2 Sheets-Sheet 2

INVENTOR.
George A. Devlin
BY
Barnes Kisselle Laughlin & Rausch
ATTORNEYS

Patented Sept. 11, 1951

2,567,699

UNITED STATES PATENT OFFICE 2,567,699

PUMP

George A. Devlin, Grosse Ile, Mich., assignor to Barnes Manufacturing Co., Mansfield, Ohio, a corporation of Ohio Application April 16, 1947, Serial No. 741,894

12 Claims. (Cl. 103—126)

This invention relates to a pump and it has to do particularly with a pump for liquids of the gear type.

In stating that the pump is of the gear type it is the intention to convey the idea that the pump members are rotary members and they have alternating projections and recesses in the nature of gear teeth which interfit with each other. The general objects of the invention include the provision of an improved construction wherein the impellers or pump members embody a plastic material, such as rubber, which may be natural rubber, synthetic rubber or other resilient plastic material. One aim of the invention is to provide a pump construction which minimizes or which may completely eliminate much friction when the pump is started but wherein the friction, which provides a sealing action, occurs under pressure as when the pump is pumping liquid under pressure. Another object is to provide for the relief of liquid under pressure at the end of the pump members to thereby minimize or eliminate axial pressure to take thrust loads off of the pump bearings or seals.

In the above connection, and in view of a free starting action without substantial friction, there may be some slippage of the pump when it is started; that is the liquid slips between the impeller members and the end sealing plates, but as the pressure increases the sealing action occurs. Accordingly, within certain limits, the volumetric efficiency of the pump increases with increase of pressure. This, of course, depends upon the initial clearance which provides the slippage, and also other factors.

A further object is to provide a pump member with a core of material which may be a metal having an exterior rubber surfacing and the core is so arranged and designed that the rubber surfacing or coating is substantially of uniform thickness throughout the extent of the pump member. With such uniform thickness, there is a resultant uniform shrinkage of the rubber when it is cooled subsequent to the molding thereof and, therefore, the size of the impeller members can be accurately controlled.

For purposes of brevity and clearness, the plastic material used in the pump will be referred to herein as rubber, it being understood that any natural or synthetic rubber or rubber-like material is included in the definition of the term rubber as used herein.

A pump constructed in accordance with the invention is disclosed in the accompanying drawings.

Figure 1:
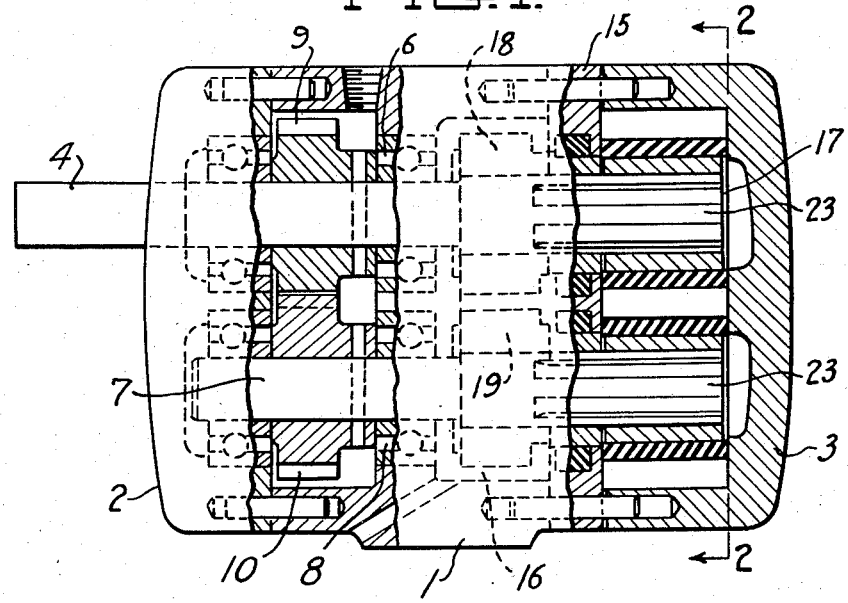
Fig. 1 is a view partly in cross section showing a pump constructed in accordance with the invention.

As illustrated in Fig. 1, the pump may comprise a suitable housing 1 with end plates 2 and 3 and journalled in the housing is a drive shaft 4. This shaft is preferably mounted in suitable anti-friction bearings 6. Another shaft 7 is mounted in the housing, preferably through the means of anti-friction bearings 8 and a pair of gears 9 and 10 operatively connect the two shafts so that they operate in unison.

Between the housing 1 and the end plate 3 is an intermediate plate 15 which serves to divide the housing into a chamber 16 and a pump chamber 17. In the chamber 16, there is disposed, around each shaft, a suitable seal 18 and 19 which frictionally functions on the surface of the plate 15 and prevents leakage of liquid from the chamber 17. This seal structure may be any one of various well-known forms on the market and a detailed disclosure thereof is therefore unnecessary.

Figure 3:
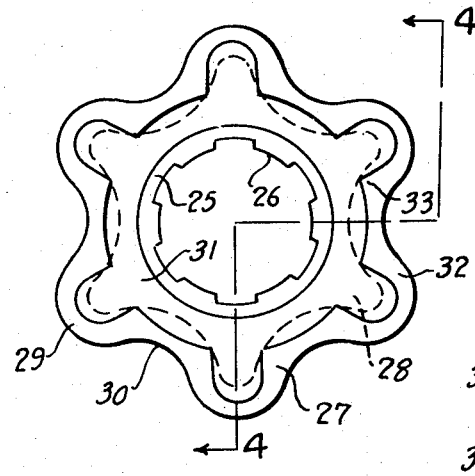
Fig. 3 is an enlarged end view of a pump member showing the core and the rubber facing.
Figure 4:
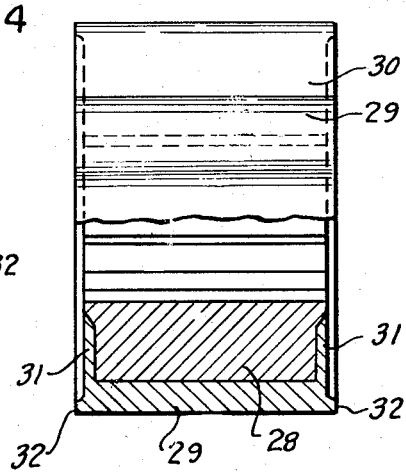
Fig. 4 is a view partly in section taken on line 4—4 of Fig. 3.

The two shafts 4 and 7 project into the chamber 17 and these shafts may be splined as at 23 for the reception of the pump members which are located in the pump chamber 17. As illustrated in Figs. 3 and 4, each pump member comprises a body or base 25 having an aperture therein with splines 26 so as to fit the splines 23 of a shaft. The body or base member 25 may be of suitable metal or other rigid material. Molded over the base member is the rubber cover generally indicated at 27. The base member is of toothed formation, the contour thereof being shown by the dotted lines and having a series of teeth 28. The rubber material molded thereover follows the contour of the base material so as to provide alternate teeth 29 and recesses 30. The thickness of the rubber material is substantially uniform throughout; this being the thickness measured from the surface of the material to the contour surface of the base member.

As illustrated in Fig. 4, some of the rubber material may cover the end faces or partially cover the end faces of the base member as shown at 31.

The rubber is provided with a projecting portion which may conveniently be termed a lip, as shown at 32. This lip follows the contour of the pump member as illustrated in Fig. 3, and at portions thereof, it may be of an increased width, as shown at 33, to give the same some added strength.

Figure 5:
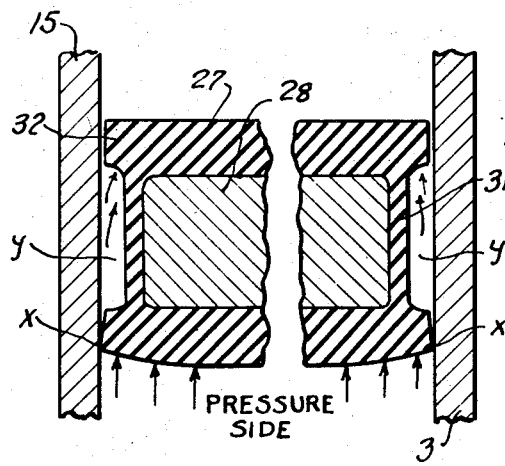
Fig. 5 is an enlarged view diagrammatically illustrating the function of the sealing action.

The rubber coating 27 over the base member 25 is of a thickness less than the depth of an impeller tooth as is clearly seen in Figs. 3 and 4. Obviously if the impellers were entirely of resilient rubber, or if substantially the entire gear teeth were of rubber, the pressure of the impellers against each other, or the pressure of the liquid on the pressure side as shown in Fig. 5, would cause great friction of the lips against the side walls of the pump chamber. By limiting the rubber thickness, the wiping pressure developed at the lips is limited.

Figure 2:
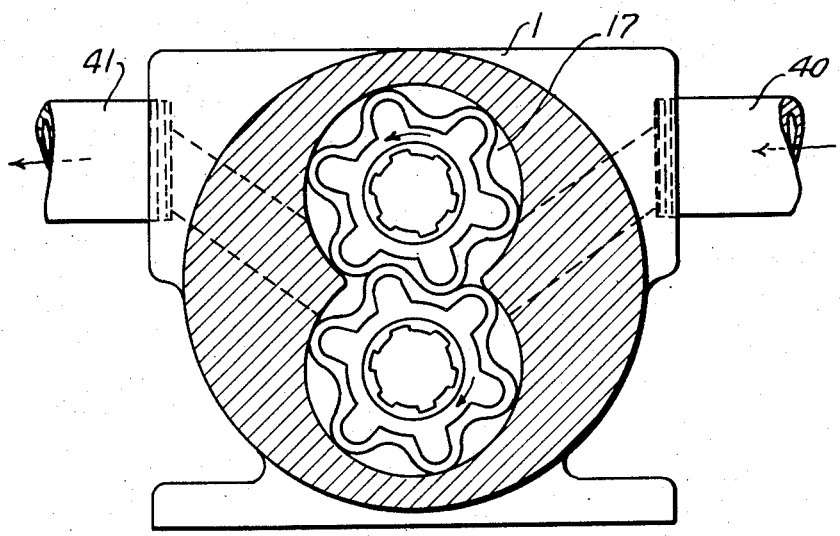
Fig. 2 is a sectional view taken substantially on line 2—2 of Fig. 1.

Two pump members are placed in the chamber 17 and are respectively mounted on the shafts 4 and 7, as shown in Figs. 1 and 2, and these pump members inter-engage each other in the fashion of gears as shown in Fig. 2. The pump body 1 is provided with a suitable inlet 40 and an outlet 41 and with this arrangement the direction of rotation is in accordance with the arrows shown in Fig. 2. The plate 15 and the end plate 3 are positioned in close proximity to the ends of the pump members and liquid is drawn in through the inlet 40, enters the recesses 30, moves through the chamber 17 counter-clockwise in the recesses of the upper pump member as shown in Fig. 2, and clockwise in the lower pump member shown in Fig. 2. Then when the gear formation of the gears intermesh with each other, the liquid is forced out through the outlet 41.

Figure 6:
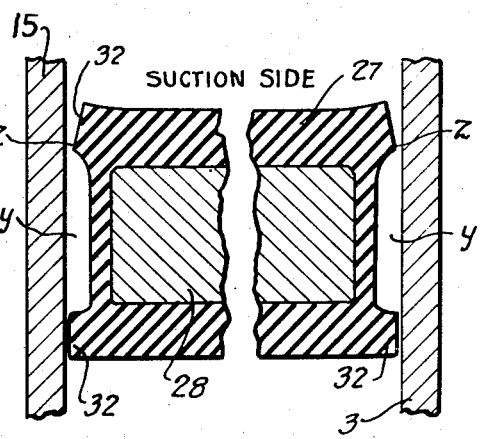
Fig. 6 is a view similar to Fig. 5 showing a portion of the pump member which might be opposite the pump member shown in Fig. 5.

In the original assembly of the pump, and in its normal static condition, a relationship between the gear members and the side plates 15 and 3 may be established in accordance with this invention. The lips 32 are arranged to provide frictional engagement with the side plates inasmuch as the lips project beyond the faces of the pump member. In the original set up, or while the pump is static, there may actually be a clearance between the faces of the lips and the side plates. This is indicated by the upper portion of Fig. 5 which diagrammatically illustrates a cross section through a tooth of one of the pump members. This is also illustrated by the lower portion of Fig. 6. Therefore, there is no friction between the faces of the lips and the side plates when the pump is first put into operation. This obviously provides for a low starting load. As one of the teeth approaches the outlet side of the pump, pressure occurs against the tooth and this is illustrated in Fig. 5. This pressure distorts the rubber of the lip and the rubber adjacent the lip so that the same is flexed as more or less diagrammatically shown in Fig. 5, and the lip is distorted as illustrated so as to make a wiping and sealing contact, as at $x$, with the side plates. The greater the pressure, within operating limits, the more the flexing and the more efficient the seal. There may be some slippage of water past the seal at the start or when there is very little pressure, but this is immaterial since as soon as the pump operates under pressure, the sealing relationship becomes better. If some of the liquid escapes past the seal, it flows into the spaces $y$, but this liquid can readily escape at the opposite side of the tooth when and where a condition of suction or partial vacuum occurs. As shown in Fig. 5, this condition is shown in exaggerated manner as the liquid which may be trapped under pressure in the space $y$, flexes the lip 32 as shown at $z$. This increases the clearances with relation to the side plates to insure escape of any liquid trapped at the ends of the pump members. This arrangement insures against building up end pressure which might otherwise place a thrust on the bearings of the shaft or on the seal members 18 or both.

It has actually been found that, within limits, the volumetric efficiency of the pump increases with increase of pressure; yet, the pump may be started always at a low load because of the minimizing of or the total lack of friction with the end faces. The clearance between the lips and the side plates in an original pump assembly may be varied as desired and depending somewhat on conditions to be encountered. Some actual original contact may be established between the lips and the side plates; this preferably being with light pressure which increases with increase in pressure of the liquid when the pump is in use.

I claim:

1. In a pump of the gear type having a chamber provided with an inlet and an outlet, said chamber having oppositely disposed side plates and said chamber adapted to receive a pair of rotary gear type pump members; a pair of pump members in the chamber and each mounted on an axis substantially at right angles to the side plates, each pump member having a tooth formation which meshes with the tooth formation of the other pump member, the toothed formation of each pump member comprising a rigid body having a rubber-like cover, the rubber-like cover of each pump member having a lip projecting axially from the cover at opposite ends, each lip being of continuous formation and following the contour of the gear formation, said lips adapted to wipe the side plates to provide the sealing action, said lips being flexible under the pressure of the pumped liquid to increase the wiping pressure with the side plates upon increase of the pressure of the liquid.

2. In a pump of the gear type having a chamber provided with an inlet and an outlet, said chamber having oppositely disposed side plates and said chamber adapted to receive a pair of rotary gear type pump members; a pair of pump members in the chamber and each mounted on an axis substantially at right angles to the side plates, each pump member having a tooth formation which meshes with the tooth formation of the other pump member, the toothed formation of each pump member comprising a rigid body having a rubber-like cover, the rubber-like cover of each pump member having a lip projecting axially from the cover at opposite ends, each lip being of continuous formation and following the contour of the gear formation, said lips having initial clearance with respect to the side plates, said lips being flexible under the pressure of the pumped liquid for movement into wiping engagement with the side plates to provide a sealing action.

3. A pump member for a gear type pump comprising, a gear shaped member having alternate teeth and recess formation, said tooth and recess formation comprising a rigid body having a cover of rubber-like material, and a lip projecting axially from the end of the cover and following the geometric shape of the gear formation, and adapted to wipe the surfaces of an end plate of a pump body.

4. A pump member for a gear type pump comprising, a gear shaped member having alternate teeth and recess formation, said tooth and recess formation comprising a rigid body having a cover of rubber-like material, and a lip projecting axially from the end of the cover and following the geometric shape of the gear formation, and adapted to wipe the surfaces of an end plate of a pump body, said lip being unbroken throughout the peripheral extent of the gear member.

5. A gear member for a gear type pump adapted to be rotatably operated between side plates of a pump comprising, a base having a rubber-like cover substantially of gear form, said cover having oppositely disposed lips projecting axially from the cover with each lip substantially following the contour of the gear shape adjacent the peripheral portions thereof, said lips being flexible and adapted to wipe the surfaces of said side plate.

6. A gear member for a gear type pump adapted to be rotatably operated between side plates of a pump comprising, a base having a rubber-like cover substantially of gear form, said cover having oppositely disposed lips projecting axially from the cover with each lip substantially following the contour of the gear shape adjacent the peripheral portions thereof, said lips being flexible and adapted to be flexed under pressure of liquid pumped thereby to wipe the surfaces of said side plates with increased pressure upon the increase of the pressure of the liquid pumped.

7. In a pump having a chamber provided with an inlet and an outlet, said chamber having oppositely disposed side plates and adapted to receive a rotary pump member; a rotary pump member in the chamber mounted on an axis substantially at a right angle to the side plates, said rotary pump member having alternate projections and recesses on its periphery and having a rigid main body portion and having a rubber-like coating bonded thereto and forming a rubber-like surface body portion, the thickness of said coating being less than the depth of said recesses, the peripheral part of the rubber-like body portion having lips projecting axially from the rubber-like body portion at opposite ends thereof for wiping the side plates, said lips following the peripheral outline of said projections and recesses continuously, said lips being flexible under the pressure of the pumped liquid to increase the wiping pressure with the side plates with increase of the pressure of the pumped liquid, whereby the limited thickness of said rubber-like coating limits the wiping pressure developed in said flexible lips.

8. In a pump of the gear type having a chamber provided with an inlet and an outlet, said chamber having oppositely disposed side plates and said chamber adapted to receive a pair of rotary gear type pump members; a pair of pump members in the chamber and each mounted on an axis substantially at right angles to the side plates, each pump member having a tooth formation which meshes with the tooth formation of the other pump member, the toothed formation of each pump member comprising a rigid main body portion having a substantially uniform rubber-like coating bonded thereto and following the tooth formation, said rubber-like coating of each pump member having a lip projecting axially from the body at opposite ends, each lip being of continuous formation and following the contour of the gear formation, said lips adapted to wipe the side plates to provide the sealing action, said lips being flexible under the pressure of the pumped liquid to increase the wiping pressure with the side plates upon increase of the pressure of the liquid, and the limited thickness of said coating limiting the wiping pressure developed at said lips.

9. A pump member for a gear type pump comprising, a gear shaped member having alternate tooth and recess formation, said tooth and recess formation comprising a rigid body having a coating of rubber-like material, and a lip projecting axially from the end of the coating material and following the geometric shape of the gear formation, and adapted to wipe the surfaces of an end plate of a pump body.

10. A pump member for a gear type pump comprising, a gear shaped member having alternate tooth and recess formation, said tooth and recess formation comprising a rigid body having a coating of rubber-like material, and a lip projecting axially from the end of the coating material and following the geometric shape of the gear formation, and adapted to wipe the surfaces of an end plate of a pump body, said lip being unbroken throughout the peripheral extent of the gear member.

11. A gear member for a gear type pump adapted to be rotatably operated between side plates of a pump comprising a rigid body substantially of gear form and having a substantially uniform coating of rubber-like material, said coating having oppositely disposed lips projecting axially from the coating with each lip substantially following the contour of the gear shape adjacent the peripheral portions thereof, said lips being flexible and adapted to wipe the surfaces of said side plate.

12. A gear member for a gear type pump adapted to be rotatably operated between side plates of a pump comprising a rigid body substantially of gear form and having a coating of rubber-like material substantially uniform in thickness over the entire periphery of the gear teeth contours, said coating having oppositely disposed lips projecting axially from said coating with each lip substantially following the contour of the gear shape adjacent the peripheral portions thereof, said lips being flexible and adapted to be flexed under pressure of liquid pumped thereby to wipe the surfaces of said side plates with increased pressure upon the increase of the pressure of the liquid pumped, and the thickness of said coating limiting the flexing of said lips.

GEORGE A. DEVLIN.

REFERENCES CITED

The following references are of record in the file of this patent:

UNITED STATES PATENTS

| Number | Name | Date |
|---|---|---|
| 1,380,798 | Hansen et al. | June 7, 1921 |
| 1,912,408 | Schelhammer | June 6, 1933 |
| 2,021,346 | Allen | Nov. 19, 1935 |
| 2,212,939 | Irgens | Aug. 27, 1940 |
| 2,246,488 | Fraser | June 17, 1941 |
| 2,383,194 | Hoopes | Aug. 21, 1945 |
| 2,403,796 | Hanna | July 9, 1946 |
| 2,407,753 | Wallgren | Sept. 17, 1946 |
| 2,460,952 | Simer et al. | Feb. 8, 1949 |

FOREIGN PATENTS

| Number | Country | Date |
|---|---|---|
| 1,392 | Great Britain | 1855 |
| 464,475 | Great Britain | Apr. ? ? 1???  |